Feb. 5, 1952            J. E. BUTLER            2,584,113
EDUCATIONAL APPARATUS FOR SIMULATING
THE OPERATION OF AIRCRAFT
Filed March 6, 1950            6 Sheets-Sheet 1
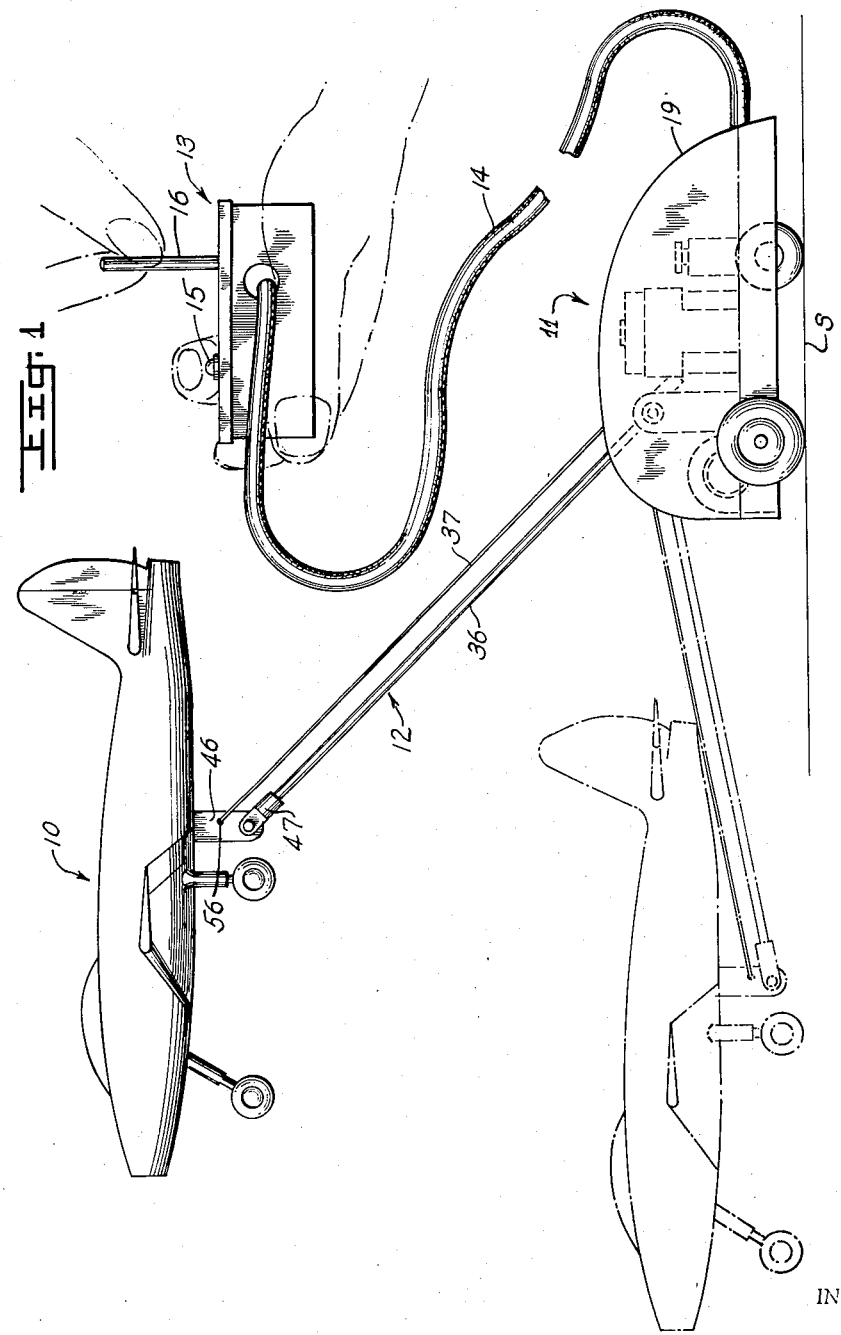
INVENTOR
Joseph E. Butler
BY Cushman, Darby & Cushman
ATTORNEYS Feb. 5, 1952  J. E. BUTLER  2,584,113
EDUCATIONAL APPARATUS FOR SIMULATING
THE OPERATION OF AIRCRAFT
Filed March 6, 1950  6 Sheets-Sheet 2
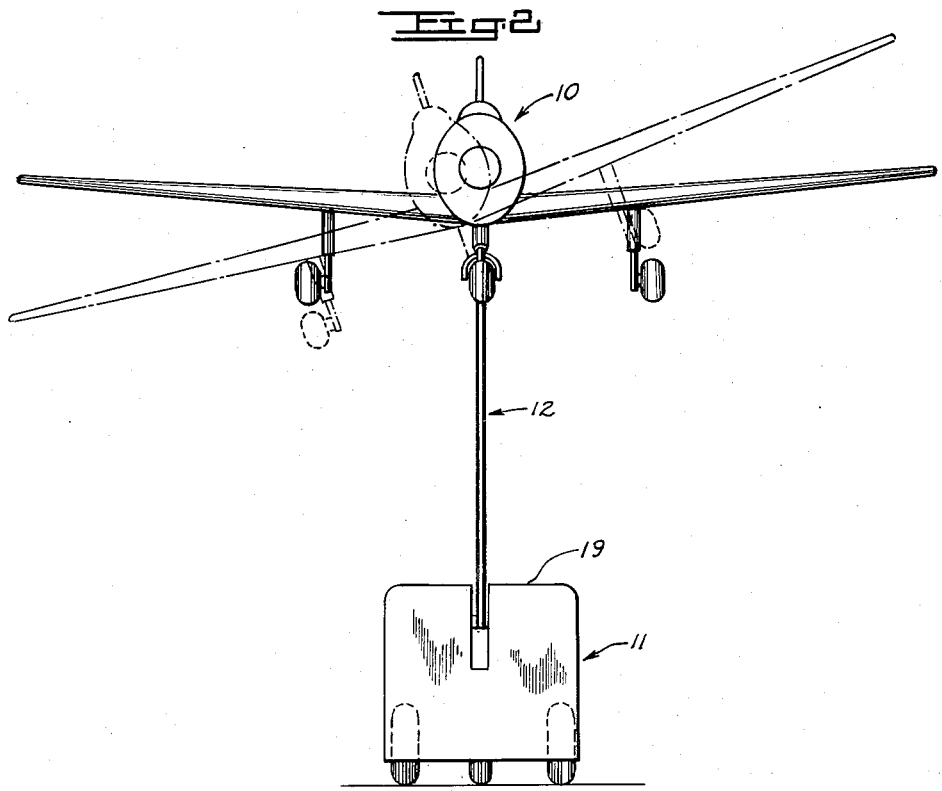
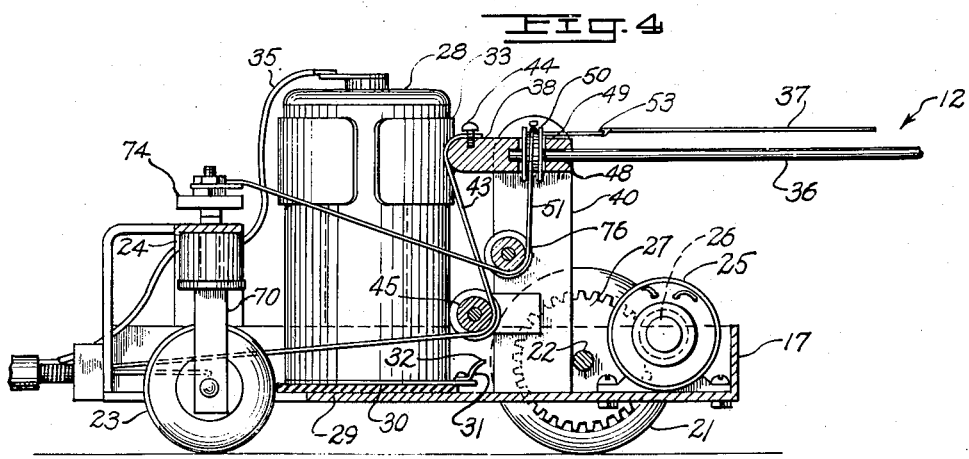
INVENTOR
Joseph E. Butler
BY Cushman, Darby & Cushman
ATTORNEYS

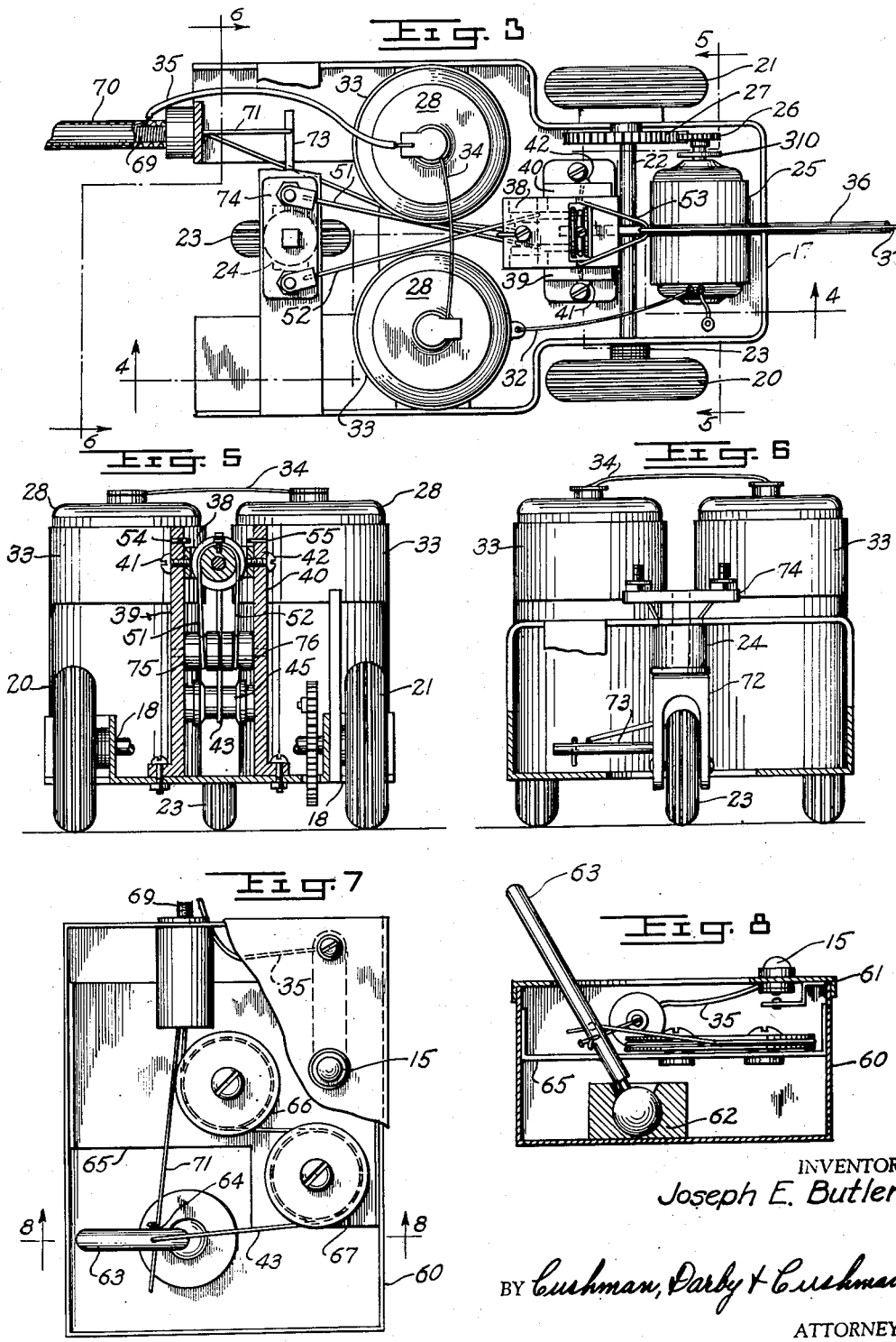

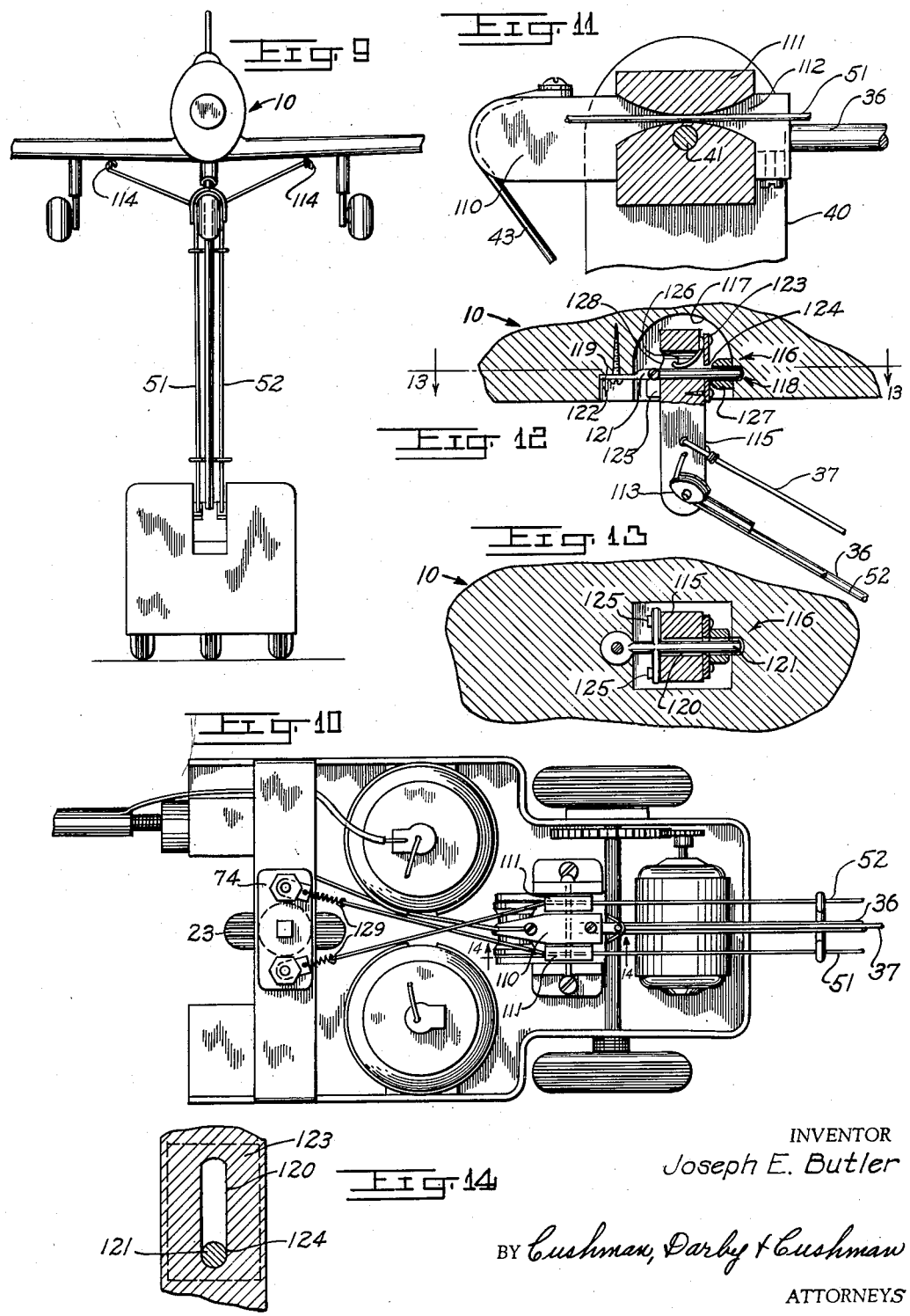

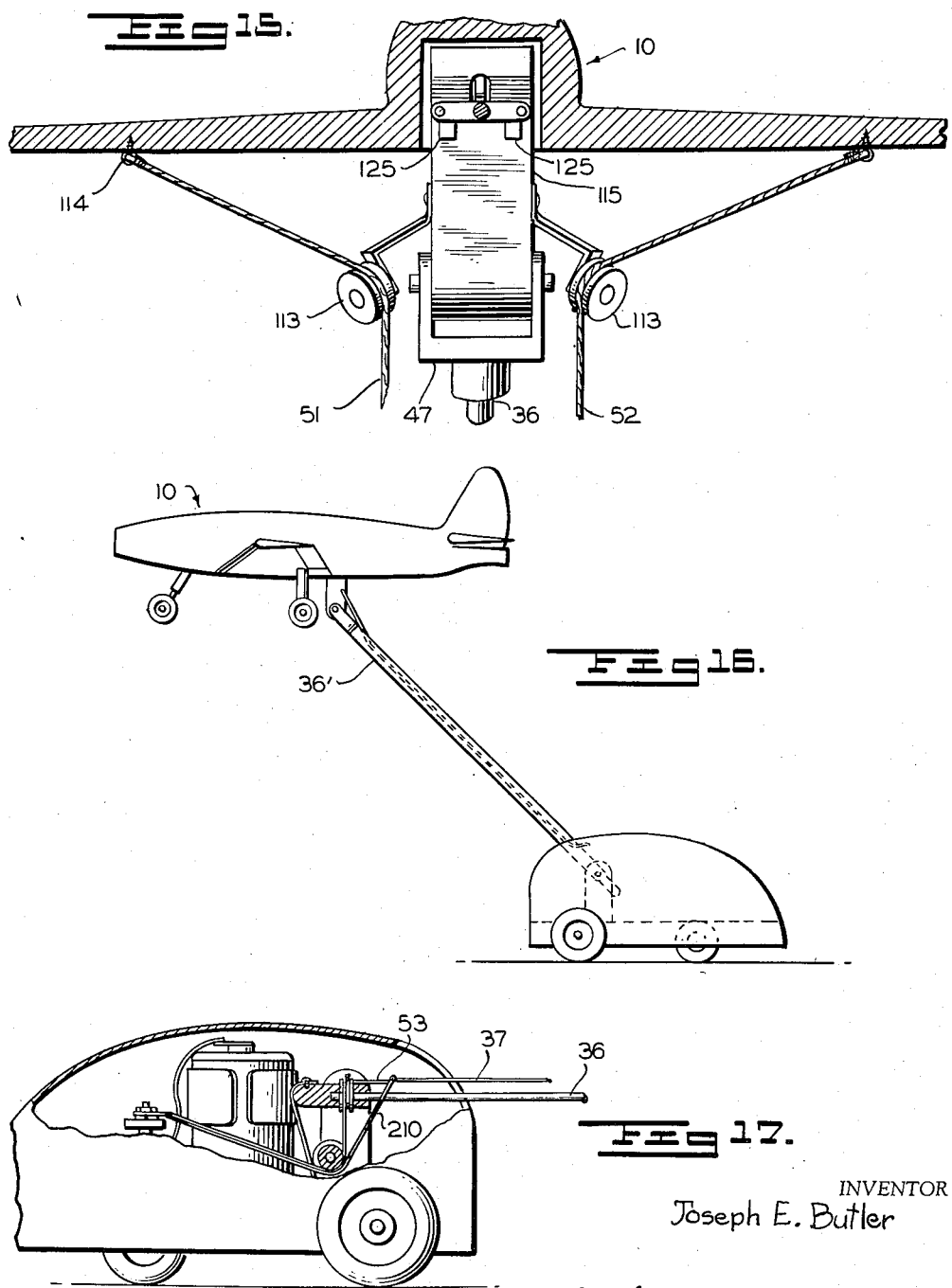

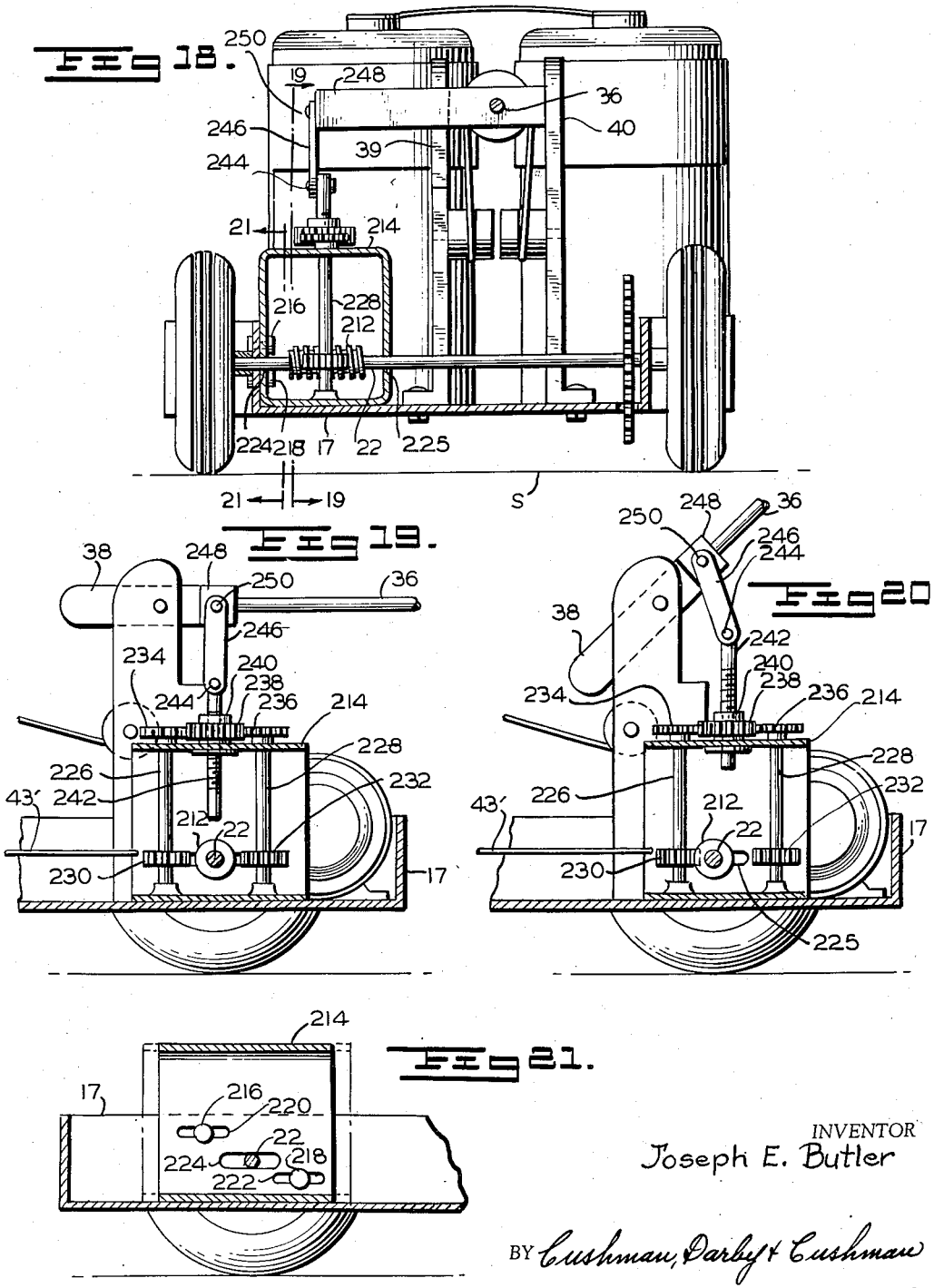

Patented Feb. 5, 1952

2,584,113

UNITED STATES PATENT OFFICE 2,584,113

EDUCATIONAL APPARATUS FOR SIMULATING THE OPERATION OF AIRCRAFT

Joseph E. Butler, Bethesda, Md., assignor to Airtoys, Inc., Bethesda, Md., a corporation of Maryland Application March 6, 1950, Serial No. 147,848

19 Claims. (Cl. 35—12)

This invention relates to educational devices involving aircraft.

It is an object of this invention to provide an educational apparatus which simulates the operation of aircraft.

It is a further object of this invention to provide an educational apparatus wherein a simulated aircraft may be maneuvered by remote control.

It is a further object of this invention to provide means for coordinating the turn of a support carrying a training aircraft with the bank of the aircraft.

It is a further object of the invention to provide means for coordinating the attitude of a simulated aircraft with the banking of the aircraft.

Further objects and the entire scope of my invention will be more fully apparent from the detailed description which follows and from the appended claims. The detailed description which follows is not intended to place a limitation on my invention. Many other embodiments of the invention will occur to others, and the true scope of the invention is therefore to be determined from the appended claims.

A better understanding of my invention may be obtained with reference to the drawings, in which Figure 1 shows the general arrangement of my invention;

Figure 2 shows a front view of the aircraft and its support;

Figure 3 shows a plan view of the support with the cover removed;

Figure 4 shows a partial cross section of the support taken along line 4—4 of Figure 3;

Figure 5 shows an end section view of the support taken along line 5—5 of Figure 3;

Figure 6 shows a rear end view of the support taken along line 6—6 of Figure 3;

Figure 7 shows a plan view of the control box with a major portion of the cover removed;

Figure 8 shows a cross-sectional view of the control box shown along the lines 8—8 of Figure 7;

Figure 9 shows a front view of a modification of my invention;

Figures 10 to 14 show details of the modification of Figure 9.

Figure 15 shows structural details of the modification of Figures 9 through 14.

Figure 16 shows another embodiment of the structure shown in the foregoing figures.

Figure 17 shows structural details of an alternative arrangement for altering the attitude of the model aircraft shown in the previous figures.

Figures 18 to 21 show details of an embodiment of the invention incorporating a gearing arrangement.

Figure 19 is a sectional view taken along line 19—19 of Figure 18 and Figure 21 is a sectional view taken along the line 21—21 of Figure 18.

With reference to Figure 1, aircraft 10 is supported on a crab or movable support 11 by means of boom 12. Control box 13 is connected to crab 11 by means of flexible control member 14. Briefly, the operator of the combination described moves the controls associated with box 13 to cause the crab 11 to move about in a desired path on a substantially horizontal plane, and at the same time, the position of the aircraft relative to the support may also be controlled to simulate the flight of an aircraft. The throttle button 15 is actuated by the fingers of one hand to cause the crab to run on a surface S, and the control stick 16 is adapted to be moved front-to-back to cause the aircraft to rise, and side-to-side to both steer the crab and bank the plane.

In greater detail, the crab 11 comprises a frame 17, on which two main driving wheels 20 and 21 are mounted by a connecting axle 22 which turns in bearings 18. The crab 11 also is supported by a third wheel 23 which is mounted for steering in a bearing block 24, the bearing block being mounted on the rear end of the frame 17. A detachable cover 19 is also provided. The crab is adapted to be propelled by means of an electric motor 25 supported at the forward end of frame 17. This motor is connected in driving relation to the axle 22 by means of associated gears 26 and 27. Electric power for the motor may be locally supplied by batteries 28, although the power supply may obviously also be located in the control box or for that matter may be supplied from completely external source through a flexible power line leading preferably to the control box. The batteries 28 rest on the bottom of the frame 17, but are separated from the frame by insulating panel 29. A strip of conducting material 30 overlies the insulating board 29 and contacts the bottom shell of the batteries to thereby provide the negative electric terminal. Where the batteries are connected in parallel, as shown in the drawings, the strip 30 extends beneath both batteries and an electrical connection 31 is made with the strip 30, and lead 32 connects the terminal 31 to one terminal of the motor 25. The batteries are supported about their mid-point by supporting bands 33, the latter being attached to the sides of the frame 17. These supports 33 will be insulated from the battery shell by reason of the customary paper container which covers the sides of the batteries. The positive terminals of the batteries are shown connected together by lead 34, and lead 35 connects the positive battery terminals to a switch in the control box, as will be more fully described below. Briefly, the control box switch connects the conductor 35 to the conducting casing of member 14, and the second terminal of the motor 25 is connected to the frame 17. It will thus be apparent that when a switch is operated at the control box, a circuit to the motor will be completed and the crab will be propelled along the surface on which it is resting.

The aircraft supporting boom 12 consists of a twistable rod 36 together with a parallel rod 37, thus forming a parallelogram support. The twistable rod 36 is mounted for rotation in an elevating block 38 mounted on uprights 39 and 40 of crab 11. As is best shown in Figures 3, 4 and 5, the block 38 is supported for pivoting in a vertical plane by pivot screws 41 and 42. An elevation cable 43 is attached to the rearward extremity of the block 38 by means of a screw 44. The cable 43 passes over pulley 45 and then proceeds to the control box. As the cable is drawn into the control conduit member 14 by the operator, as will be more fully described below, it is apparent that the block 38 will be rotated counterclockwise from the position indicated in Figure 4.

The aircraft 10 is equipped with a rigidly attached depending post 46 to which the rod 36 is pivotally attached by means of a yoke 47. This yoke is rigidly attached to rod 36 and therefore rotation of rod 36 about its axis will cause the aircraft to bank. While the amount of bank will decrease as the rod 36 is elevated toward a vertical position, nevertheless the decrease will not be appreciable until a nearly vertical position of the rod is approached. The rod may be rotated about its axis and the plane correspondingly banked by reason of the fact that rod 36 is twistably mounted in a socket 48 in block 38. A slot 49 is provided in block 38 so that a pulley 50 may be affixed to the rod 36, and banking cables 51 and 52 run over pulley 50 and are attached thereto at the upper portion.

The aircraft is maintained in a substantially constant longitudinal attitude by reason of the parallelogram rod 37. The crab end of rod 37 is attached to the center of a yoke 53, the ends of the latter being attached to the uprights 39 and 40 by extending through apertures 54 and 55 in the said uprights. These apertures are located directly above the pivot points 41 and 42 of the block 38.

The aircraft end of the rod 37 is pivotally attached to the post 46 at a point 56 a distance above the pivotal connection of rod 36 substantially equal to the distance between points 41 and 54 on the upright 39 of crab 11. A parallelogram is thus provided which will cause the aircraft to maintain a constant attitude as the boom 12 is raised and lowered. Further features of the parallelogram action will be described later.

The remaining features of the crab 11 can best be understood by next considering the control box. Referring to Figure 7, the control box comprises a base 60 and a cover 61. A ball socket 62 is attached to the bottom of the frame 60, the socket serving to retain the universally shiftable control stick 63. The cover 61 of the control box is cut away to permit the movement of the control stick 63 in any direction. A shelf 65 is attached to the base 60 of the control box and serves to support pulleys 66 and 67. The cover 61 of the control box also supports a switch means 15 which is employed to ground to base 60 the cable 35 which supplies the positive potential from the batteries 28.

The control box is operatively connected to the crab by means of a flexible wrapped wire casing 69. This casing has a conventional rigid attachment at its ends to the base of the control box 13 and to the frame 17 of the crab 11. The casing 69 may be surrounded by a cloth cover 70 (Figure 3) to provide an attractive appearance and to contain the insulated lead wire 35.

Contained within the casing 69 are two control members, one of which is the previously mentioned elevating cable 43, and the other is a steering rod 71, the function of which is explained in detail below. In the control box, rod 71 proceeds directly from casing 69 to an attachment point on control stick 63, while cable 43 is guided around pulley 66 and then pulley 67 so that it may be attached to stick 63 at right angles to rod 71.

The switch means 15 is intended to be employed as the throttle for the aircraft. When the switch is closed, the lead 35 is grounded to base 60 and a return path to frame 17 of crab 11 accordingly provided, whereby the motor 25 is energized.

From the above description of the control box together with portions of the crab 11, it will be apparent that when the control stick is moved left and right, as viewed in Figure 7, the control cable 43 will be pulled through the casing 69 and will serve to rotate the block 38 of crab 11. The weight of the aircraft will serve to rotate the block 38 in a clockwise direction, as viewed in Figure 4, and will place the control stick 63 in the forward or low-altitude position. When the operator pulls the stick rearwardly, or to the left in Figure 7, the plane is raised upwardly to simulate flying. This movement of the control stick simulates the actual operation of an aircraft commensurate with the permissible cost of my device when intended as a toy. Means for closer simulation will be hereinafter described.

The aircraft may also be banked and turned by means also associated with the control stick 63, as will now be explained. Referring to Figure 6, the tail wheel 23 is supported by a yoke 72. A projecting pin 73 extends from the left-hand side of the yoke 72 and is engaged near its outer end by the steering rod 71. The steering rod is preferably of relatively stiff material so that it may be pushed and pulled through the casing 69 by virtue of its connection to control stick 63 at connecting point 64. It will thus be apparent that when the stick 63 is moved from side to side, or up and down as viewed in Figure 7, the steering pin 73 will rotate the yoke 72 in the previously mentioned bearing 24. The foregoing apparatus therefore provides means of steering the crab 11 by pushing the stick 63 in the direction in which it is desired that the aircraft turn. This action is closely characteristic of the manner in which an actual aircraft is put into a turn.

As is well known, the proper turning of an aircraft in flight is necessarily accompanied by a banking of the plane in the direction of the turn. I provide for simulation of this operation by means of a cross arm 74 mounted for rotation with the yoke 72. Attached to the cross arm 74 are the banking cables 51 and 52 previously mentioned. These cables run over two banking pulleys 75 and 76 on uprights 39 and 40 and proceed to pulley 50 which is mounted in the block 38, as previously described. It is thus seen that when the yoke 72 and cross arm 74 are rotated by means of the steering cable 71, the rod 36 will be turned in its seat in block 38. The twisting of the rod causes the plane to bank by reason of the connection of the rod 36 to the post 46 which extends from the bottom of the aircraft 10. As the rod 36 is twisted it is apparent that the plane will be caused to bank, as shown best in Figure 2.

The parallelogram rod 37 serves two very important purposes in regard to my invention. First, when the plane is in a level attitude, the rod 37 serves to keep the plane substantially in a constant longitudinal attitude. This rod may be flexible and act only in tension if the nose of the plane is heavier than the tail. Or if it is otherwise desired, the rod may be rigid and act in tension or compression. The joint 56 on post 46 is made loose enough to permit a ball-socket effect to take place when rod 36 is rocked. In compression, the yoke 53 would be arranged to prevent flexing.

The second important function of the rod 37 is to more closely reproduce the actual conditions observed in the operation of an aircraft in a turn. As will be well understood by those skilled in the art of flying, when a turn is undertaken, banking of the plane will result in the nose dropping. The pilot then elevates the nose so that what amounts to a climbing attitude is achieved. In other words, an aircraft turns essentially by climbing around the turn and the plane will appear in a climbing or nose high attitude. I provide for the coordinated banking of the plane and raising of the nose to simulate the correct attitude by the fact that the effective length of the parallelogram rod 37 becomes shorter as the plane is banked. This may be best understood by considering the fact that the yoke 53 is mounted on the uprights 39 and 40 and does not turn laterally with the rod 36. Thus, as the rod 36 is rotated by the steering cables, the effectively decreasing distance between yoke 53 and joint 56 causes the post 46 to rotate clockwise as viewed in Figure 1 about the pivotal joint joining post 46 and rod 36.

I show in Figures 9 through 14 a modification of my invention in which another means is disclosed for causing the nose-high attitude of the plane to be coordinated with the banking of the plane. In this modification, the parts which are similar to those of the previously described modification are numbered accordingly.

In this modification, the rod 36 is fixedly attached to a block 110 which is similar to block 38 of the previously described modification. The yoke 53 remains mounted on the uprights 39 and 40. The banking cables in this modification pass closely adjacent the pivot screws 41 and 42 which support the block 110 and proceed alongside the supporting boom 12 to the aircraft end of the said boom. As shown in Figure 10, a guide block 111 is provided at each side of the rotatable block 110. The guide blocks 111 are provided with flared apertures 112 to guide the banking cables near the pivot screws 41 and 42. The fact that these cables pass substantially through the pivoting point prevents any appreciable lengthening of the cable as boom 12 is raised. The foregoing arrangement is best shown in Figures 9 and 10. Pulleys 113 (Figure 12) are provided on the pivot at the aircraft end of the rod 36, about which the cables 51 and 52 proceed to attaching points 114 on the undersurface of the wings of the aircraft. The aircraft 10 in this modification is provided with a post 115 which is rotatable with respect to the body of the aircraft about the longitudinal axis thereof.

In this modification as thus far described, it is apparent that when the cross arm 74 rotates when the crab is steered, the banking cables 51 and 52 serve to rotate the aircraft about the pivotal joint 116 between the post 93 and the aircraft 10. The banking cables 51 and 52 do not affect the raising and lowering of the aircraft in its flying attitude, since the said cables follow the rod 36 closely by virtue of the guide blocks 111 and the small pulleys 113. The connection points 114 are furthermore located in line with the post 115. The pulleys 113 are of the deep groove type and are pivoted at an angle in any suitable manner to permit the lateral deflection of the cables to points 114. This detail may be readily understood with reference to Figure 15. Relatively stiff springs 129 (Figure 10) may also be provided to compensate for any lengthening of the cable path.

If the coordinated nose-high attitude of the plane is not desired, the joint between the post 115 and the aircraft 10 may be a simple pivot pin. I show in Figures 12 and 13, however, a means for elevating the nose of the plane when the latter is banked by means of the banking cables 51 and 52. A cavity 117 is formed in the underside of the aircraft at the post location, and the rearward end of the cavity is drilled to form a socket 118. A shoulder 119 is formed on the forward end of the cavity. The post 115 is cut away so that a slot 120 is formed therein. A T-shaped cam member 121 is placed in slot 120, the rearward end fitting loosely into the socket 118 and the forward end having a flattened area 122 for fixing the T-cam in place in the aircraft. A plate 123 is attached to the rearward face of the post 115 to provide a pivot aperture 124 through which the cam 121 passes. The forward face of the post 115 is also provided with two spaced camming lugs 125, which engage the side arms of cam 121 when the cam is rotated relative to the post 115.

From the foregoing description, it will be apparent that when banking cables 51 and 52 are operated to bank the aircraft, the cam 121, being fixed to the aircraft, will rotate therewith, causing an arm of cam 121 to engage a lug 125 and thereby pivot the cam shaft in the aperture 124. In this manner, the nose of the aircraft automatically rises when a bank occurs.

A spring member 126 may be placed in the slot 120 to normally retain the cam along the bottom of slot 120. A spacer 127 is also provided to prevent rearward movement of the post relative to the plane, and the forward face of the post is cut away on an arc 128 to prevent binding of the cam arms.

It will also be apparent that other arrangements are possible which will coordinate the nose-up attitude of the plane with the bank of the plane. For example, in the modification as shown in Figure 1, the rod 36 may be hollow and the cable 37 flexible, in which case the cable 37 may be run inside the tube 36 for the greater part of the distance between the aircraft 10 and the crab 11. This arrangement, shown in Figure 16, where the rod is designated 36', will provide the same parallelogram action but at the same time will prevent the cable 37 from being exposed.

All the modifications may also be otherwise adapted to provide for the coordination of the bank and nose-up attitude. For example, means can readily be provided whereby the turning of the cross arm 74 can act on the yoke 53 or on the cable 37 directly to shorten the latter when the yoke 74 is turned. This could be provided for, for example, by attaching auxiliary cables 210 as shown in Figure 17 to the arm 74 and running both cables to the junction between the yoke 53 and the cable 37. In this way, when the yoke 74 is turned counterclockwise, as viewed in Figure 10, the upper or left-hand cable would rotate the aircraft 10 clockwise about pivot 55, as viewed in Figure 1. At the same time, the cable attached to the lower or right-hand end of cross arm 73 would merely slacken. The nose-up attitude of the aircraft would then result no matter which way the cross arm 74 was turned. These auxiliary cables could be run over pulleys 75 and 76 to clear the block 110.

It will also be apparent that the forward motion of the crab may be coordinated with the raising and lowering of the plane to create an even more realistic simulation of aircraft operation. That is, the stick control 63 instead of being directly connected to raise and lower the plane could rather be connected to coordinate the block 38 (or 110) to the rotating axle 22 through suitable reversible gearing and clutches, whereby, as is the case in actual flight, the plane would rise only when the crab was in motion. In more detail, the operator would first energize the motor 25 to place the crab in motion and the control stick 63 would then be pulled back to engage a gear with a suitable gear on the axle 22 and the plane would rise as long as these gears were engaged. Then when a desired flying altitude has been obtained, the stick could be returned to the neutral position and the aircraft would remain at that altitude. To lower the plane, the control stick would then be pushed to a forward position which would engage the gearing in a reverse manner to lower the aircraft.

A suitable gearing arrangement according to the foregoing is illustrated in Figures 18-21. The axle 22 is provided with a worm 212 keyed thereto. A slidable housing 214 is mounted for movement on frame 17, the housing being attached to the frame by means of studs 216 and 218 mounted on frame 17 and cooperating with elongated apertures 220 and 222, respectively, in housing 214. Axle 22 passes through elongated apertures 224 and 225 in the opposite sides of housing 214. The housing is arranged to occupy forward, neutral and rearward positions under the action of wire 43'. Wire 43' will be similar to the raising and lowering control wire 43, which latter wire operated block 38 (or 110) over pulley 45 in previously described embodiments. Accordingly, as wire 43' is moved forward and rearward housing 214 may slide to occupy any of the above mentioned positions.

Housing 214 is provided with vertical shafts 226 and 228 which extend between the lower and upper walls of housing 214 to the front and rear, respectively, of axle 22. Shafts 226 and 228 have keyed thereto gears 230 and 232, respectively, which will engage worm 212 when the housing 214 is properly positioned. Figure 19 shows the neutral position, while Figure 20 shows gear 230 engaging worm 212 with housing 214 in its forward position. Engagement of gear 232 with worm 212 will be apparent. From the foregoing, it will be understood that shafts 226 and 228 will rotate in opposite directions when engaged with worm 212.

At the upper wall of housing 214 shafts 226 and 228 have keyed thereto gears 234 and 236, respectively. Engaging each of these gears is an idler gear 238 being suitably pivoted on housing 214. Keyed to gear 238 is an internally threaded bushing 240 which receives a threaded post 242, this post having at its upper end a stud 244 on which is pivotally mounted a link 246. The opposite end of link 246 is in turn pivotally mounted on block arm 248 by means of stud 250. Block arm 248 is an extension of block 38 (or 110) forward of the pivot point of block 38 (or 110).

Assuming the crab to be in forward motion, the axle 22 will turn clockwise as viewed in Figures 19 and 20. With the worm having a right hand pitch as shown in Figure 18, the sides of gears 230 and 232 adjacent worm 212 will move to the right in Figure 18. Therefore, looking down on the device, shaft 226 will turn counterclockwise and shaft 228 clockwise, when gears 230 and 232, respectively, may be engaged with worm 212. Accordingly, post 242, having a right hand thread, will move up when gear 230 is engaged and down when gear 232 is engaged with worm 212.

In operation, if the plane is initially at rest on the surface S, a take-off may be simulated by starting the crab in motion and then moving housing 214 forward to engage gear 230 with worm 212. The plane will then "climb" at a uniform rate. When a desired altitude is reached, the controls are moved to neutral and housing 214 in neutral position disengages both gears for cruising at the selected altitude. To descend, gear 232 is engaged, as will be apparent.

The acceleration time in taking off and the glide effect in landing after the power has been removed from the propelling motor may also be very accurately simulated by providing a fly-wheel in connection with the axle 22. A suitable fly-wheel could in fact be mounted on the shaft of the motor 27 as shown at 310 on Figure 3 or could be taken off at an appropriate point on the gearing connecting motor 27 to the axle 22. In operation, the speed of the motor and therefore the crab would be greatly reduced in starting while the fly-wheel was brought up to speed. Conversely, when the power is disconnected from motor 27, the fly-wheel would tend to carry on the rotation for an appreciable period of time. The provision of such inertia means to simulate the glide period is very important when one considers that the device when so equipped could be employed to instruct in one of the most difficult aspects of aircraft operation, namely, the judging of the proper glide path. The device may be employed in conjunction with a landing area marked on the horizontal surface on which the apparatus is being operated to provide training in the actual maneuver of an aircraft.

I wish it to be understood that the apparatus which provides for the coordinated turning and banking of the aircraft as the crab is steered, and which further provides for the coordinated raising of the nose when the aircraft is banked, does not depend in its operation on the existence of a remote control station, and may also be employed in a device where the operator is located in the crab itself, or in the aircraft.

Where reference is made in the appended claims to the longitudinal axis of the aircraft, this is intended to be extending in a direction from nose-to-tail, and the lateral axis of the aircraft is a line extending in a direction between the wing tips.

It is to be further understood that the above detailed description of my invention has been made for purpose of illustration and is not to be taken in a limiting sense. The true scope of my invention is to be understood from the appended claims.

I claim:

1. In apparatus of the class described, a crab adapted for steerable movement on a horizontal surface, supporting means extending from the crab and movable relative to the crab in a vertical plane, a model aircraft, means for mounting the aircraft on the extended end of the supporting means, means for moving the supporting means in said vertical plane so that the aircraft may be elevated between the horizontal surface and predetermined heights above the surface, means including the supporting means for banking the aircraft relative to the crab, means to propel the crab, means including control means connected to steer the crab, and means interconnecting the crab steering means and the banking means whereby the bank of the aircraft is coordinated with the steering of the crab on the horizontal surface.

2. In apparatus of the type described, a crab adapted for steerable movement on a horizontal surface, means for propelling the crab along the surface, means for steering the crab, a model aircraft, supporting means extending from the crab, the model aircraft being mounted on the supporting means at the end of the latter remote from the crab, the supporting means being so mounted at the crab to permit movement of the aircraft in a vertical plane, the supporting means including banking means arranged to bank the aircraft relative to the crab, a control station, a propulsion operating device located in the control station and connected to the propelling means for energizing the crab propelling means, and a control device located in the control station, the control device being connected to the supporting means to move the aircraft supporting means in the vertical plane, the control device also being connected to the steering means to steer the crab, and linkage means interconnecting the crab steering means and the aircraft banking means and arranged to bank the aircraft in coordination with the steering of the crab.

3. Apparatus as in claim 2 wherein the supporting means includes parallelogram means to automatically rotate the aircraft about its lateral axis as the aircraft is banked, whereby the aircraft assumes a varying longitudinal attitude in coordination with the banking of the aircraft.

4. Apparatus as in claim 2 wherein the supporting means includes cam means to automatically rotate the aircraft about its lateral axis as the aircraft is banked, whereby the aircraft assumes a varying longitudinal attitude in coordination with the banking of the aircraft.

5. Apparatus as in claim 2 wherein the crab propelling means includes an inertia device mounted on the propelling means and movable therewith to simulate acceleration effects upon occurrence of changes in energization of the propelling means.

6. Apparatus as in claim 2 and further including a gear device operatively connected with the supporting means for coordinating the vertical movement of the support with the movement of the crab on the horizontal surface.

7. Apparatus as in claim 2 wherein the banking means includes means for rotating the support means about its axis.

8. Apparatus as in claim 2 wherein the banking means includes cable means interconnecting the crab and aircraft.

9. Apparatus as in claim 2 wherein the support means includes a main member and an auxiliary parallelogram member.

10. Apparatus as in claim 9 wherein the auxiliary member is contained within the main member over a predetermined length of the main member.

11. In apparatus of the type described, a crab adapted for steerable movement on a horizontal surface, means for propelling the crab along the surface, means for steering the crab, a model aircraft, supporting means extending from the crab, the model aircraft being mounted on the supporting means at the end of the latter remote from the crab, the supporting means being so mounted at the crab to permit movement of the aircraft in a vertical plane, the supporting means including banking means arranged to bank the aircraft relative to the crab, a remote control station connected with the crab through means comprising a flexible control member, a propulsion operating device located in the control station and connected through the flexible control member to the propelling means for energizing the crab propelling means, and a control device located in the control station, the control device being connected through the flexible member to the aircraft supporting means to move the aircraft supporting means in the vertical plane, the control device also being connected through the flexible control member to the steering means to steer the crab, and linkage means interconnecting the crab steering means and the aircraft banking means and arranged to bank the aircraft in coordination with the steering of the crab.

12. Apparatus as in claim 11 wherein the supporting means includes parallelogram means to automatically rotate the aircraft about its lateral axis as the aircraft is banked, whereby the aircraft assumes a varying longitudinal attitude in coordination with the banking of the aircraft.

13. Apparatus as in claim 11 wherein the supporting means includes cam means to automatically rotate the aircraft about its lateral axis as the aircraft is banked, whereby the aircraft assumes a varying longitudinal attitude in coordination with the banking of the aircraft.

14. Apparatus as in claim 11 wherein the crab propelling means includes an inertia device mounted on the propelling means and movable therewith to simulate acceleration effects upon occurrence of changes in energization of the propelling means.

15. Apparatus as in claim 11 and further including a gear device operatively connected with the supporting means for coordinating the vertical movement of the support with the movement of the crab on the horizontal surface.

16. Apparatus as in claim 11 wherein the banking means includes means for rotating the support means about its axis.

17. Apparatus as in claim 11 wherein the banking means includes cable means interconnecting the crab and aircraft.

18. Apparatus as in claim 11 wherein the support means includes a main member and an auxiliary parallelogram member.

19. Apparatus as in claim 18 wherein the auxiliary member is contained within the main member over a predetermined length of the main member.

JOSEPH E. BUTLER.

REFERENCES CITED

The following references are of record in the file of this patent:

UNITED STATES PATENTS

| Number | Name | Date |
|---|---|---|
| 1,937,241 | Pardue | Nov. 28, 1933 |
| 2,179,663 | Link | Nov. 14, 1939 |
| 2,298,305 | Muller | Oct. 13, 1942 |
| 2,326,764 | Crane | Aug. 17, 1943 |
| 2,332,475 | Sorensen | Oct. 19, 1943 |
| 2,409,238 | Barber | Oct. 15, 1946 |
| 2,428,706 | Hardell | Oct. 7, 1947 |
| 2,459,150 | Crane | Jan. 18, 1949 |
| 2,526,371 | Laughead | Oct. 17, 1950 |
| 2,536,474 | Susdorf | Jan. 2, 1951 |